Patented June 2, 1936

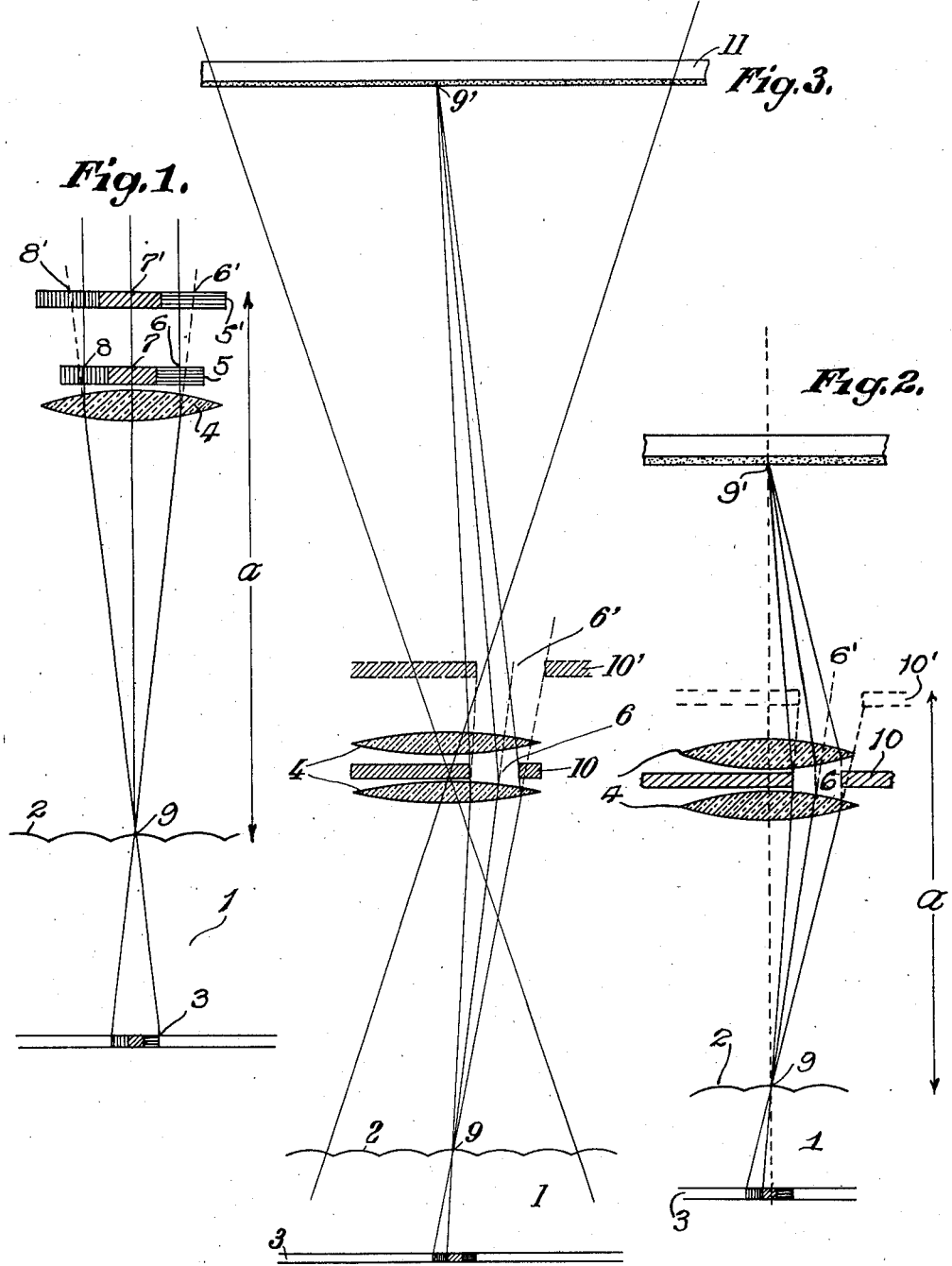

2,042,895

UNITED STATES PATENT OFFICE 2,042,895

COLOR PHOTOGRAPHY

Gerd Heymer, Dessau-Ziebigk, Germany, assignor to Agfa Ansco Corporation, Binghamton, N. Y., a corporation of New York Application September 7, 1932, Serial No. 632,024
In Germany September 8, 1931

5 Claims. (Cl. 88—24)

My present invention relates to the manufacture of partial-color pictures and more particularly to the manufacture of partial-color pictures by printing onto smooth film the different color sensations registered on lenticular film by taking an object on such film behind a multi-color filter.

One of its objects is to provide a process for printing the different color sensations registered on a lenticular film onto smooth film. Another object is a device for the aforesaid process. Further objects will be seen from the detailed specification following hereafter. Reference is made to the accompanying drawings in which—

Fig. 1 represents diagrammatically the relation between multi-color filter, objective and lenticular film when the film is exposed;

Fig. 2 represents diagrammatically the printing of the different color sensations registered on the lenticular film onto smooth film according to my invention in the same size as has the negative on the lenticular film;

Fig. 3 represents diagrammatically the same printing operation as Fig. 2 with the difference that an enlarged copy is obtained;

In the drawings the same reference characters are applied to denote corresponding parts.

Figure 4:
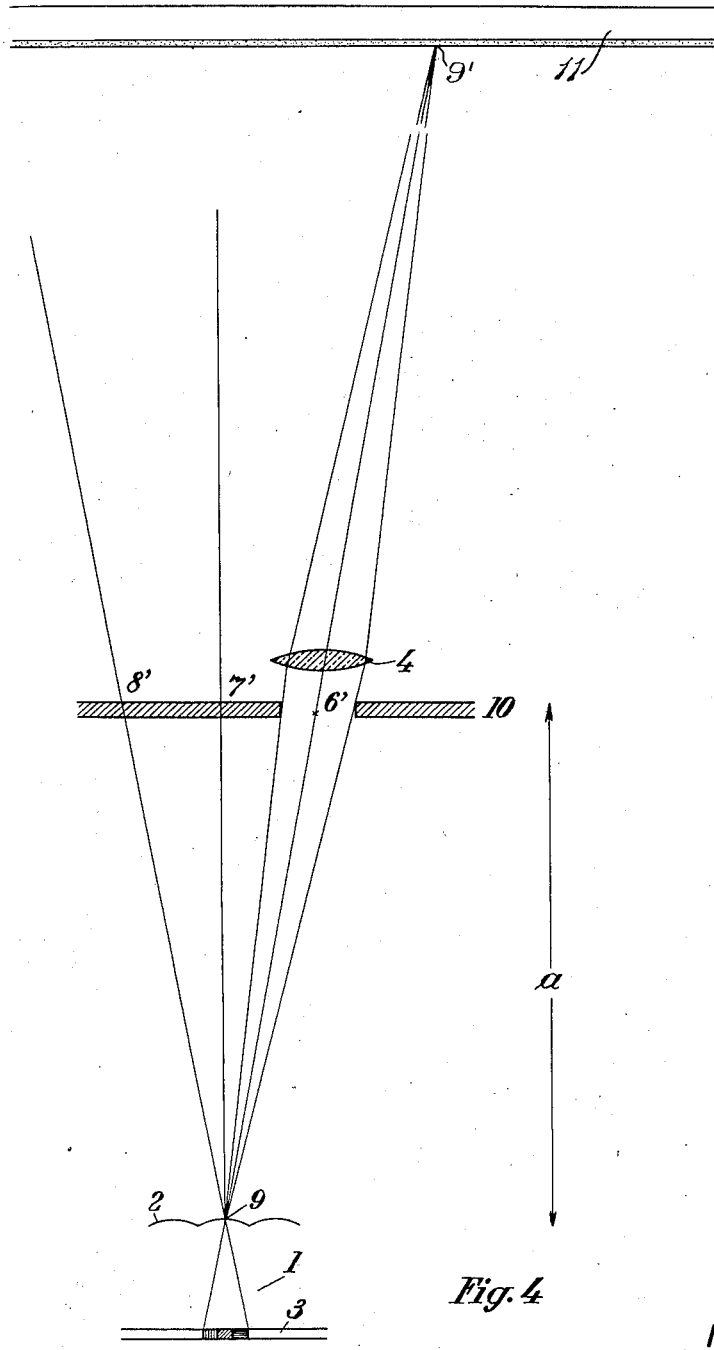
Fig. 4 represents diagrammatically printing of the color sensations of the lenticular film with an objective of small aperture.

A known method of producing a partial-color picture by printing a negative on a film embossed with refractive microscopic elements, of the kind, for instance, used in the well known Berthon process, consists in illuminating the film in such a manner that it is traversed by the rays of light, and projecting, with the aid of the objective with which the negative was taken, a real picture of the original on a light-sensitive layer, there being placed in the plane in which the multi-color filter was placed during the exposure a diaphragm which intercepts in each case the areas of all stripes of the color filter except one.

According to my invention there is provided an optical arrangement for use in the production of partial-color pictures from lenticular negatives. The characteristic feature of this arrangement is the application not of the objective with which the pictures were taken, but of any other objective, for instance, one having a different focal length. The application of an objective other than that used for taking the pictures is necessary in many cases, for instance, in the printing of enlarged partial-color pictures.

The optical arrangement comprises any kind of objective and a stop which in their mutual cooperation are subject to the condition that a pupil of emergence of determined properties is formed (the term "pupil of emergence" is used throughout the specification and claims with reference to the direction of the light in the operation of taking the negative which is to be printed from). By giving the stop a suitable size and arranging it at a determined distance from the film and the objective, the pupil of emergence is adjusted so that the apparent distance of the multi-color filter from the lenticular film during its exposure, when viewed from the side of the negative, is equal to the apparent distance of the stop in the printing apparatus from the negative film, also when viewed from the side of the negative, whereas the apparent size of the exposure filter must be equal to the apparent size of the aperture which is formed when none of the areas of the filter plane is obturated.

Besides, the objective and the stop are chosen and arranged so that the apparent breadth of the pupil of emergence is not larger than the breadth of that color stripe of the exposure filter that corresponds in each case with the color sensation to be printed. Under these conditions and when operating in a manner which will be fully described hereafter, it is possible to use objectives with smaller apertures than those which would correspond with the total breadth of the exposure filter.

I will now give a more detailed description of my invention with reference to the accompanying drawings.

In Fig. 1 which shows the arrangement for taking a picture 1 is the lenticular film having the lenticular elements 2 and the light-sensitive layer 3. The light proceeding from an object is projected on the lenticular film by means of the objective 4 after having passed through a three-color filter arranged before the objective and dyed in the usual colors red, green and blue. The optical centers of the three-color areas are marked 6, 7 and 8. In the figure the rays are shown for producing a picture point 9. The parallel light rays coming from an infinite distance (there are shown those which pass through points 6, 7 and 8 of the three color filter) are collected by the objective so as to meet at point 9. An eye at point 9 looking in direction of the objective would see not the filter 5, but the virtual image 5' thereof. The optical centers of the virtual image 6', 7' and 8' of the virtual image of the filter correspond with the optical centers 6, 7 and 8 of the filter itself and lie on the rays drawn from point 9 to the points 6, 7, and 8. $a$ is the distance of the virtual image of the filter.

Fig. 2 illustrates the invention in the case when there is used in the printing process an objective having an aperture such that the virtual image of the stop suitably arranged in the path of the beam of light, corresponds with the virtual image of the three-color filter which was used in taking the negative on the lenticular film. For the production of the single partial-color pictures the stop has an aperture of dimensions corresponding with one color area of the three-color filter. In Fig. 2, the objective is marked 4, but has focal length different from that shown in Fig. 1. The position of stop 10 is such that the apparent distance $a$ of this stop from the negative corresponds exactly with the distance $a$ of the virtual image of the filter from the lenticular film when the negative was taken. The virtual image of the stop forming the pupil of emergence is shown at 10'. In printing the different color sensations the center of the aperture of the stop corresponds with points 6, 7 and 8 of Fig. 1. All the light passing through the aperture of the stop converges to copy the point 9 at point 9' on the printing material. As printing is only effected through the stop 10, i. e. its virtual image 10' the copy formed on the printing material 11 must be one partial-color picture. In Fig. 2 there is shown printing of the red sensation; the green and the blue sensations are produced in the same manner by displacing the stop in its plane parallel to the negative film. The center of the virtual image of the stop must, for printing each color sensation, coincide with one of the points 6', 7' and 8' shown in Fig. 1. If, as shown in Fig. 2 the copying objective is equidistant from negative and print there is no enlargement of the original.

In Fig. 3 there is shown an optical arrangement for printing in which the aperture of the copying objective is the same as in Fig. 2 but wherein the copy obtained is larger than the original. Also in this case the size of the pupil of emergence and its center equal the virtual image of the corresponding color area and its center in Fig. 1.

In Fig. 4 there is shown an arrangement, for the case in which the objective used for the enlargement has an aperture of such a small size that the virtual image of the color filter used in taking the lenticular negative cannot be projected unmasked. In the arrangement shown in this figure the size of the aperture of the stop itself is exactly equal to that of one color area of the three-color filter, since, as the objective 4 is placed between the copying material and the stop, the stop itself forms the pupil of emergence. It may be pointed out, however, that the dimension of the aperture of the stop in the direction of the lenticular elements is arbitrary but that the dimension of the aperture of the stop in the direction perpendicular to the lenticular elements should be at most equal to that of the virtual image of the corresponding color area used when the negative was taken. If the opening of the stop has a smaller breadth, of course, an objective of smaller aperture can be used. In the printing operation illustrated in Fig. 4 the objective cannot remain in the same position for printing all the partial-color pictures; however, the position of the stop with regard to the objective remains the same. The three positions for printing the color sensations are determined by points 6', 7' and 8' of Fig. 1 with which the center of the aperture in the stop must coincide, as indicated by the numbers 6', 7' and 8' in Fig. 4, the objective being shifted in accordance therewith. The area occupied by the printing material 11 must also be displaced in such a manner that point 9 of the negative film is always projected to the same place of this area.

This lateral displacement can be avoided. In this case the objective remains in a fixed position and the negative and the printing material are turned around axes which pass through the points at which the optical axis of the objectives intersects the negative and the printing material respectively and are parallel to the lenticular elements of the negative. The negative and the print must be turned to such an extent that the perpendicular drawn from the center of the picture field passes through the points 6', 7' and 8'. In the case of the printing material this condition need only be observed approximately, the permissible degree of variation from the true inclination depending on the sharpness of the print obtainable with the objective; this is of course dependent on the definition obtainable with the printing objective in use.

Figure 5:
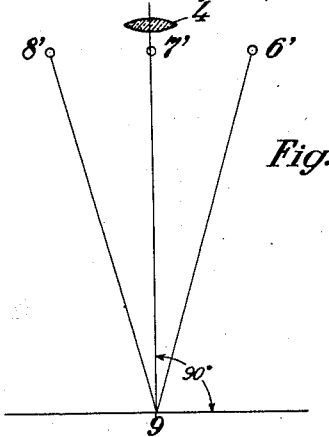
Figs. 5, 6 and 7 represent diagrammatically printing of the different color sensations wherein the position of the objective of small aperture is not changed but the film is turned for the printing of each color sensation at an angle defined by the conditions which existed when the lenticular film was exposed.
Figure 6:
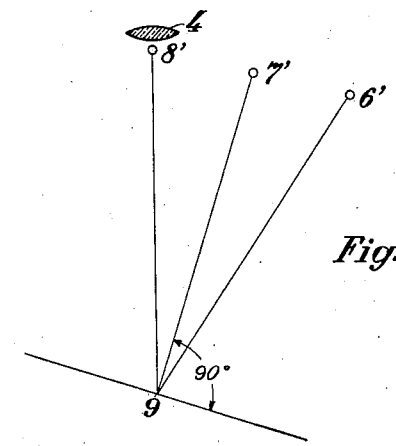
Figure 7:
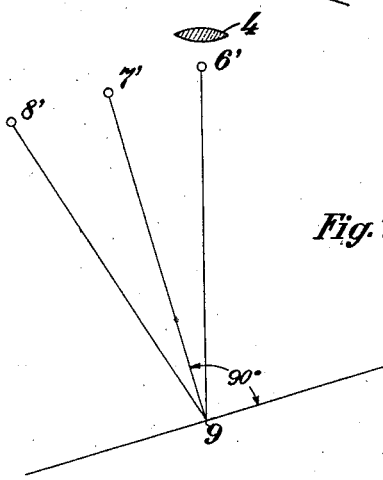

In Figs. 5, 6 and 7 there are shown the three steps of the last described process. Point 9 of the negative and the center of the objective 4 lie in each step in the same straight line. The stop (not shown) is arranged as indicated in Fig. 4. The film is turned around an axis formed by a line parallel to the edges of the negative and passing through 9. In all the Figs. 5, 6 and 7 the lines 9—6', 9—7' and 9—8' have been drawn. For printing each partial-picture, the negative is turned to such an extent that the aforesaid lines 9—6', 9—7' and 9—8' pass one after the other through the center of the objective. In the position shown in Fig. 5 the line 9—7' passes through the center of the objective; in this case the green sensation is printed. In the position shown in Fig. 6 the line 9—8' meets the center of the objective and the blue sensation is printed. Correspondingly in the arrangement shown in Fig. 7 the red sensation is printed.

My present invention is not limited to the foregoing examples nor to the specific details given therein. It may be applied to the manufacture of as many partial-color pictures as correspond with the number of colors of the multi-color filter used in exposing the lenticular film.

In the foregoing description the printing of partial-color pictures from lenticular negatives has been described. It is to be understood, however, that lenticular positives may be similarly printed, the partial-color pictures produced in this case being negatives when developed in the usual way, and positives when developed by the reversal method.

What I claim is:

1. A device for printing partial color pictures from originals taken on lenticular film through a multi-color filter which comprises a lenticular film provided with an original and a light sensitive ordinary printing film arranged at a substantial distance from each other, an objective arranged between the original and the printing material, said objective having an aperture smaller than that of the objective used in exposing the lenticular film and a stop inserted in the path of the beam of light, said stop forming a pupil of emergence at a distance from the original corresponding with that of the multi-color filter from the original when the latter was taken, said pupil of emergence having a breadth equal to that of the corresponding color area of the multi-color filter or its virtual image used when the original was taken, means for displacing said stop for printing each partial color picture, means for displacing said objective to form said pupil of emergence with said stop and means for displacing said printing film when displacing said objective.

2. A device for printing partial color pictures from originals taken on lenticular film through a multi-color filter which comprises a lenticular film provided with an original and a light sensitive ordinary printing film arranged at a substantial distance from each other, an objective arranged between the original and the printing material, said objective having an aperture smaller than that of the objective used in exposing the lenticular film and a stop inserted in the path of the beam of light, said stop forming a pupil of emergence at a distance from the original corresponding with that of the multi-color filter from the original when the latter was taken, said pupil of emergence having a breadth smaller than that of the corresponding color area of the multi-color filter or its virtual image used when the original was taken, means for displacing said objective, means for displacing said stop so as to bring them into the correct optical relation for printing each partial color and means for displacing said printing film when displacing said objective.

3. A process of printing partial color pictures from originals taken on lenticular film through a multi-color filter which comprises inserting between the lenticular film and the printing material an objective of smaller aperture than that used in exposing the original and a stop forming a pupil of emergence at a distance corresponding with that of the multi-color filter used when the original was taken, said pupil of emergence having a breadth corresponding at most with that of the corresponding color area, displacing said objective, and said stop for producing the correct optical relations for printing each partial color picture, and displacing the printing material accordingly.

4. A process of printing partial color pictures from originals taken on lenticular film through a multi-color filter which comprises inserting between the lenticular film and the printing material an objective of smaller aperture than that used in exposing the original and a stop forming a pupil of emergence at a distance corresponding with that of the multi-color filter used when the original was taken, said pupil of emergence having a breadth corresponding at most with that of the corresponding color area, displacing the objective and the stop for printing each partial color picture into a position such that the center of the pupil of emergence coincides in respect of the original with the optical center of the corresponding color area of the multi-color filter or its virtual image used in taking the original and displacing the printing material accordingly.

5. A device for printing partial color pictures from an original on lenticular film through a multi-color filter which comprises a lenticular film provided with an original and a light-sensitive ordinary printing film arranged at a substantial distance from each other, an objective arranged between the original and the printing material, said objective having an aperture at most equal to that of a strip of the multi-color filter used in exposing the lenticular film and a stop inserted in the path of the beam of light, said stop forming a pupil of emergence at a distance from the original corresponding with that of the multi-color filter from the original when the latter was taken, said pupil of emergence having a breadth at most equal to that of the corresponding color area of the multi-color filter or its virtual image used when the original was taken, means for displacing said stop for printing each partial color picture, means for displacing said objective to form this pupil of emergence with said stop and means for displacing said printing film when displacing said objective.

GERD HEYMER.